Aug. 2, 1949.    G. J. PERLOW ET AL    2,477,646
LIGHT INTENSITY REGULATION
Filed May 3, 1945
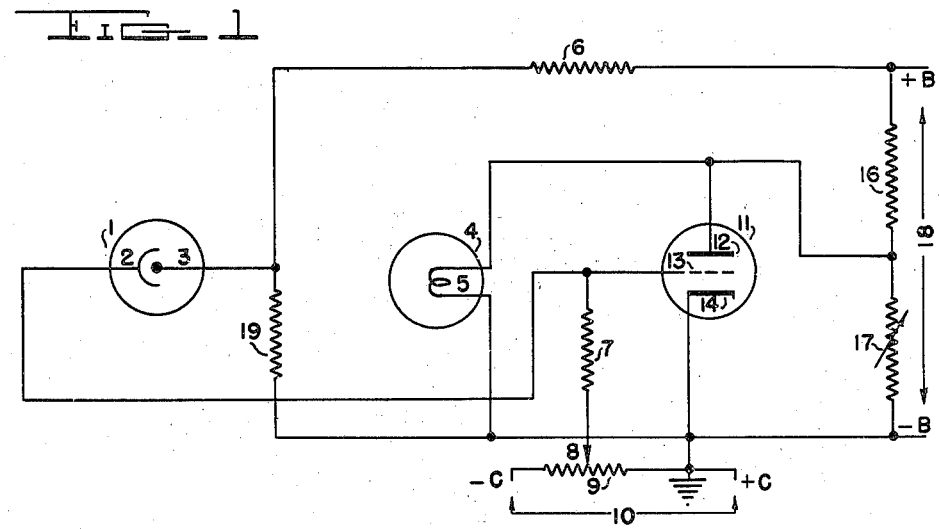
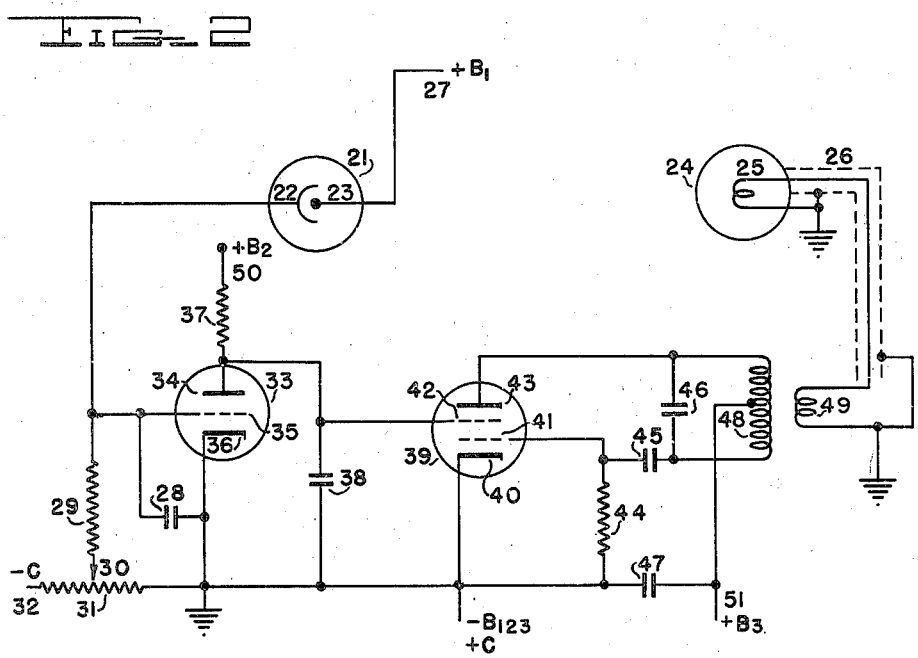
Inventor
GILBERT J. PERLOW
GLENN A. JOHNSON
By Ralph L Chappel
Attorney Patented Aug. 2, 1949

2,477,646

UNITED STATES PATENT OFFICE 2,477,646

LIGHT INTENSITY REGULATION

Gilbert J. Perlow and Glenn A. Johnson, Washington, D. C.

Application May 3, 1945, Serial No. 591,764

4 Claims. (Cl. 315—151)

(Granted under the act of March 3, 1883, as amended April 30, 1928; 370 O. G. 757)

This invention relates to control of the intensity of illumination from a light source, and in particular it relates to a system, using a photosensitive element and a light source, in which the intensity of light striking the photo-sensitive element can be adjusted to a desired value and be thereafter held essentially constant at that value, notwithstanding substantial changes in external conditions, voltage of power sources, etc.

This invention finds useful application in any situation where control of illumination at a constant value is desirable, including applications in television, photography, photoelectric sweep circuits for cathode ray tubes and many other fields.

The invention will be further described with reference to the exemplary embodiments shown in the drawings, in which:

Figure 1 is a schematic drawing of an embodiment in which the controlled light source is a lamp powered by direct current, and Figure 2 is a schematic drawing showing an embodiment of the invention using radio frequency current to actuate the controlled light source.

Constant intensity electrical light sources must, for many applications, be supplied with direct or high-frequency alternating current, because the use of 60 cycle current results in a "flicker" or rapid variation in intensity which, while usually invisible to the eye, will seriously interfere with the operation of light-sensitive photographic or electrical apparatus.

Referring to Figure 1, this embodiment of the invention comprises a light source, lamp 4, and a photo-sensitive device, photoelectric cell 1. The photoelectric cell is positioned within the zone of stabilized illumination to receive incident light from lamp 4. An illumination control means for varying the light incident on cell 1 from the lamp is provided. The control means is responsive to the cell output, and operates to stabilize the incident flux thereon, varying the light received from the lamp.

In the circuit of Figure 1, lamp 4 contains a filament 5, one side of which is connected directly to ground, which is also the negative terminal of source 18. The other terminal of filament 5 is connected to the positive terminal of source 18 through resistor 16. In this circuit the incident light is controlled directly by variation in the source intensity. Control tube 11 has its cathode 14 connected to ground, which is the negative side of filament 5 of lamp 4. Plate 12 of tube 11 is connected to the positive side of filament 5. Variable resistor 17 is also connected directly across the terminaals of lamp filament 5. Resistor 16, then, carries not only the current drawn by lamp 4 but also the plate current of tube 11 and the bleeder current drawn by resistor 17. Photoelectric cell 1 is illuminated by light, including light from lamp 4. The anode 3 of cell 1 may be connected to any convenient positive D. C. voltage source. Here it is shown connected to the midpoint of the voltage divider consisting of resistors 6 and 19, which are connected across D. C. source 18. Cathode 2 of cell 1 is connected through load resistor 7 to the tap 8 on potentiometer 9, which is a point negative with respect to ground. When light strikes cathode 2 of cell 1, cell 1 passes a current which flows through load resistor 7 and causes a voltage drop therein. Grid 13 of tube 11 is connected to the less negative end of resistor 7.

The system operates as follows: The brilliance of lamp 4 may be controlled by variable resistor 17 and potentiometer 9. Variation of resistor 17 alters the bleeder current and thus affects the total voltage drop across resistor 16. Variation of the movable tap 8 on potentiometer 9 changes the grid bias on tube 11 and thus affects its plate current, which also influences the total voltage drop across resistor 16. Resistor 17 and potentiometer 9 should be so adjusted that lamp 4 is at appropriate brilliance to give the desired total illumination of cell 1 and the grid bias on tube 11 is of such value that the tube is operating near the middle of the linear portion of its grid voltage-plate current characteristic. Any increase in the illumination of cell 1 causes the current through it to increase, thereby increasing the voltage drop across resistor 7 and making grid 13 less negative. This increases the plate current of tube 11, which increases the voltage drop across resistor 16 and reduces the voltage across filament 5, thus causing lamp 4 to grow less brilliant. Decrease in the illumination of cell 1 operates conversely to make lamp 4 more brilliant. Consequently the total illumination of cell 1, and that of the illuminated zone, is held substantially constant at the desired level.

Figure 2 shows an embodiment of the invention which employs radio frequency current to activate a controlled light source. This embodiment of the invention holds the illumination level constant within very narrow tolerances and offers great flexibility with respect to the current and resistance characteristics of the controlled electric light source. In this embodiment tube 39, a screen-grid type tube, is connected as an oscillator, any convenient circuit and any convenient radio frequency being employed. In Figure 2, tube 39 is shown connected as a Hartley oscillator, coil 48 and condenser 46 forming the tank circuit, condenser 45 and resistance 44 serving as grid condenser and grid leak respectively, and condenser 47 acting as by-pass condenser. In a specific construction employing the invention, an operating frequency of 600 kilocycles was used. The filament 25 of lamp 24, the controlled light source, is connected by transmission line 26 to coil 49, which is inductively coupled to coil 48 of the oscillator tank circuit. Plate voltage for tube 39 is obtained from source 51. Screen grid 42 of tube 39 is connected to the plate 34 of tube 33, and both are connected to the positive terminal of source 50 through resistor 37. Condenser 38 is a radio frequency by-pass condenser. Cathode 40 of tube 39, cathode 36 of tube 33, the negative terminals of sources 50, 51, and 27 and the positive terminal of source 32 are all connected to ground. Photoelectric cell 21 is illuminated by light, including light from lamp 24, the controlled light source. The anode 23 of cell 21 is connected to the positive terminal of source 27. Cathode 22 of cell 21 is connected through load resistor 29 to tap 30 on potentiometer 31, a point which is negative with respect to ground. When light strikes cathode 22 of cell 21, cell 21 passes a current which flows through load resistor 29 and causes a voltage drop therein. Grid 35 of tube 33 is connected to the less negative end of resistor 29. Condenser 28 is a radio frequency by-pass condenser.

The system operates as follows: The brilliance of lamp 24 may be controlled by moving tap 30 on potentiometer 31. Movement of tap 30 toward the negative end of potentiometer 31 makes the grid 35 of tube 33 more negative, thus reducing the plate current of tube 33. The reduced current through resistor 37 reduces the voltage drop across resistor 37 and raises the voltage applied to screen grid 42 of tube 39. The increased screen voltage raises the output of the oscillator of which tube 39 is a component, increases the induced current in coil 49 and thus causes lamp 24 to become more brilliant.

If tap 30 on potentiometer 31 be moved toward the ground end of potentiometer 31, conversely the oscillator output is reduced and the lamp 24 is made less brilliant. The total illumination of photoelectric cell 21 is thus set to the desired level. Thereafter any increase in the illumination of cell 21 causes the current through cell 21 to increase, which increases the voltage across resistor 29 and makes grid 35 of tube 33 less negative. This increases the plate current of tube 33, which raises the voltage across resistor 37 and lowers the screen voltage of tube 39. As a result the oscillator output drops and causes lamp 24 to be less brilliant. A decrease in illumination of cell 21 operates conversely to cause lamp 24 to brighten. Accordingly the total illumination of cell 21 is held very nearly constant notwithstanding relatively large changes in external conditions or in the voltage of the sources employed.

It will be understood that the embodiments shown and described are exemplary only, and that the scope of the invention will be determined with reference to the appended claims.

The invention herein described may be manufactured and used by or for the Government of the United States of America for governmental purposes without the payment of any royalties thereon or therefor.

What is claimed is:

1. An illumination control system comprising an electrical light source, a photo-sensitive element positioned to receive light from said light source, oscillator means energizing the light source, and control means responsive to said photo-sensitive element operative to control said oscillator means to vary the output intensity of said light source inversely with the intensity of light incident on said photo-sensitive element.

2. An illumination control system comprising an electrical light source, a photo-sensitive element positioned to receive light from said light source, a vacuum tube oscillator operative to energize the light source, said vacuum tube including a control element, and control means responsive to said photo-sensitive element operative to control the potential on said control element of the said vacuum tube to vary the output intensity of said light source inversely with the intensity of light incident on said photo-sensitive element.

3. An illumination control system comprising an electrical light source, a photo-sensitive element positioned to receive light from said light source, a vacuum tube oscillator operative to energize the light source, and circuit means responsive to said photo-sensitive element operative to control the amplitude of oscillations of said oscillator to vary the ouput intensity of said light source inversely with the intensity of light incident on said photo-sensitive element.

4. An illumination control system comprising an electrical light source, a photo-sensitive element positioned to receive light from said light source, a vacuum tube containing a cathode, an anode, a control grid, and a screen grid, circuit means coupling the vacuum tube electrodes in an oscillator circuit operative to energize the light source, and circuit means responsive to said photoelectric element operative to control the screen grid potential of said vacuum tube to vary the output intensity of said light source inversely with the intensity of light incident on said photo-sensitive element.

GILBERT J. PERLOW.
GLENN A. JOHNSON.

REFERENCES CITED

The following references are of record in the file of this patent:

UNITED STATES PATENTS

| Number | Name | Date |
|---|---|---|
| 1,107,438 | Moskowitz | Aug. 18, 1914 |
| 1,958,986 | Culver | May 15, 1934 |
| 2,012,821 | King | Aug. 27, 1935 |
| 2,043,671 | McMaster | June 9, 1936 |
| 2,158,193 | Morse | May 16, 1939 |
| 2,242,638 | Balsley | May 20, 1941 |
| 2,269,324 | Turner et al. | Jan. 6, 1942 |
| 2,319,287 | Arendt | May 18, 1943 |
| 2,356,195 | Balsley | Aug. 22, 1944 |